United States Patent [19]
Takizawa

[11] Patent Number: 5,903,405
[45] Date of Patent: May 11, 1999

[54] HARD DISK DRIVE ENABLING EFFICIENT USE OF STORAGE CAPACITY OF A RECORDING MEDIUM

[75] Inventor: Noboru Takizawa, Kyoto, Japan

[73] Assignee: Rohm Co., Ltd., Kyoto, Japan

[21] Appl. No.: 08/093,311

[22] Filed: Feb. 2, 1993

[30] Foreign Application Priority Data

Feb. 3, 1992 [JP] Japan .................................. 4-047576

[51] Int. Cl.⁶ .................................................. G11B 05/09
[52] U.S. Cl. .................................................. 360/53; 360/48
[58] Field of Search .................................. 360/32, 51, 53, 360/48, 46, 49

[56] References Cited

U.S. PATENT DOCUMENTS

| | | | |
|---|---|---|---|
| 4,357,702 | 11/1982 | Chase et al. ................................. | 371/1 |
| 4,496,993 | 1/1985 | Sugiyama et al. ..................... | 360/48 X |
| 4,758,907 | 7/1988 | Okamoto et al. .......................... | 360/48 |
| 4,862,292 | 8/1989 | Enari et al. ............................ | 360/32 X |
| 4,873,679 | 10/1989 | Murai et al. ........................... | 360/48 X |
| 4,979,054 | 12/1990 | McCullough et al. .................... | 360/48 |
| 5,063,453 | 11/1991 | Yoshimura et al. ....................... | 360/32 |
| 5,148,328 | 9/1992 | Kakuyama ................................ | 360/27 |

*Primary Examiner*—Donald Hajec
*Assistant Examiner*—Le Thien Minh
*Attorney, Agent, or Firm*—Baker & Botts, LLP

[57] ABSTRACT

Receiving a track address, an ECC selection signal generation circuit generates a selection signal. In accordance with the selection signal, a read/write circuit selects the number of bits of an ECC to be added to data. Typically, a plurality of numbers of bits are assigned to respective groups of tracks such that the number of bits becomes smaller as the group of tracks is closer to the outermost track.

5 Claims, 2 Drawing Sheets

HARD DISK DRIVE ENABLING EFFICIENT USE OF STORAGE CAPACITY OF A RECORDING MEDIUM

BACKGROUND OF THE INVENTION

The present invention relates to a hard disk drive having an error correcting function.

Conventional hard disk drives have a rotatable disk-shaped recording medium, and data are recorded on concentric tracks arranged on the recording medium. Usually, a magnetic material is used in the recording medium (hereinafter referred to simply as "medium") in view of cost, storage capacity, etc. However, it is impossible to manufacture a medium which can provide a 100%-perfect recording state. As a countermeasure, an error correction code (hereinafter referred to as "ECC") is added to the data to enable correction of a possible recording error at a certain location on the medium to provide a virtually perfect recording state. Thus, clearing various requirements for cost, storage capacity, etc., the medium is now put into practical use.

FIG. 2 shows a fundamental constitution of the above type of conventional hard disk drive. In FIG. 2, reference numeral 20 represents a hard disc drive (HDD); 10, a computer main body for controlling the hard disk drive 20; 11, a bus line for devices that conform to standards of SCSI etc.; and 30, another hard disk drive (HDD). The hard disk drive 20 includes a bus interface 21, a controller 22, a track address register 23, a head arm drive circuit 29, a read/write head arm 24, a medium 25, a read/write circuit 27, and a serial/parallel conversion circuit 28.

With the above constitution, in accordance with a write instruction sent from the computer main body 10 to the hard disk drive 20 via the bus line 11, the data is written to the proper track on the medium 25.

More specifically, the write instruction is provided to the controller 22 via the bus line 11 and the bus interface 21, and a track address indicating a writing location on the medium 25 is provided to the track address register 23 and retained therein. Receiving the track address, the head arm drive circuit 29 drives the head arm 24 under the control of the controller 22 so that a read/write head is positioned on the proper track.

Upon completion of the mechanical operation, parallel write data is sent from the computer main body 10, and converted to serial data by the serial/parallel conversion circuit 28. The ECC of, for instance, 88 bits that is calculated from the serial data is added to the serial data, and the ECC-added data is written to the proper track.

Although the synchronization with the rotational phase of the medium 25 is actually taken, a head drive mechanism, medium rotational drive mechanism, etc. are neither illustrated nor explained here for simplification of the description.

Then, in accordance with a read instruction sent from the computer main body 10 to the hard disk drive 20 via the bus line 11, the data recorded on the subject track on the medium 25 is read.

More specifically, the read instruction is provided to the controller 22 via the bus line 11 and the bus interface 21, and a track address indicating a reading location on the medium 25 is provided to the track address register 23 and retained therein.

Receiving the track address, the head arm drive circuit 29 drives the head arm 24 under the control of the controller 22 so that a read/write head is positioned on the proper track.

Upon completion of this mechanical operation, the read/write circuit 27 reads, via the head, the ECC-added data recorded on the subject track. The ECC-added data may include a recording error originating from the medium property etc. To accommodate such a case, the original data is calculated back and reproduced from the ECC-added data using the ECC that has been added to the data. The ECC has the restoration ability proportional to the number of bits, and original data having only slight errors can be completely restored. Even in many of the cases where the data restoration is impossible, the error detection is possible.

The serial data thus read and restored is converted by the serial/parallel conversion circuit 28 to parallel data that conforms to the standard of the bus line 11, and the parallel data is provided to the computer main body 10.

The read/write circuit 27 writes to the medium 25, the data which has been given the ECC, and the original data is calculated back and reproduced from the ECC-added data read from the medium 25. In this manner, the write and read operations of the hard disk drive 20 can be performed with a high accuracy.

As described above, to use the medium that cannot be 100%-perfect, the conventional hard disk drive realizes the error correcting function by recording the ECC-added data and provides cost reduction, high-density recording, etc.

Although necessary for the error correction, the ECC is redundant information unlike the data proper and reduces the storage area of the medium available for the data. Therefore, the quantity of the ECC should be as small as possible.

On the other hand, since the medium is a rotational disk, the probability of the error occurrence is different in the inner tracks and in the outer tracks; that is, usually the error occurrence is less likely in the outer tracks. Further, it may frequently be the case that due to variations in the manufacturing process, materials, etc., individual media have different tracks which are likely to be associated with an error.

However, the conventional hard disc drives employ the ECC having the number of bits that corresponds to the general probability of error occurrence at the innermost track in which an error is most likely to occur. And the ECC having the same number of bits (i.e., excessively redundant) is added to the data that is to be recorded on the outer tracks in which the error occurrence is relatively unlikely. This is not preferable because the storage capacity of the medium is consumed vainly as much.

SUMMARY OF THE INVENTION

In view of the above problems in the art, an object of the present invention is to provide a hard disk drive which can efficiently utilize the storage capacity of a medium.

According to the invention, a disk drive apparatus in which an error correction code is added to data before it is written to a recording disk medium, comprises:

a selection signal generation circuit responsive to a track address indicating an access location on the medium, for generating a selection signal to be used for selecting a number of bits of the error correction code; and a read/write circuit for performing a data read or write operation to the medium while selecting the number of bits of the error correction code in accordance with the selection signal.

In the disk drive apparatus of the invention, the selection signal is output in accordance with the track address. For example, when the track address indicates an inner track, the selection signal for selecting the same number of bits of the ECC as the conventional case is output, and when the track address indicates an outer track, the selection signal for selecting the smaller number of bits than the conventional case is output. Since the read/write circuit changes over the number of bits of the ECC in accordance with the selection signal, the number of bits is reduced for the outer portion of the medium. Since the error occurrence is relatively unlikely in the outer portion, the reliability is well assured over the entire medium. As a result, unnecessarily redundant information is removed from the outer portion, so that more data proper can be recorded by such as much.

The selection signal generation circuit may have a collation table in which a parameter for selecting the most suitable number of bits of the ECC is set, during an adjustment of the apparatus, for each track in accordance with its inspection result. Since the most suitable number of bits of the ECC for the track indicated by the track address can always be selected, a local deterioration to some extent of the medium can be remedied by selecting therefor a large number of bits of the ECC. As a result, the effective storage capacity can be increased while the reliability is maintained, compared to the case where the number of bits of the ECC is fixed. Further, the production yield of media can be increased because, in some cases, even somewhat defective media may also be remedied.

DESCRIPTION OF THE PREFERRED EMBODIMENTS

A hard disk drive according to an embodiment of the present invention is hereinafter described with reference to a block diagram of FIG. 1.

Figure 1:
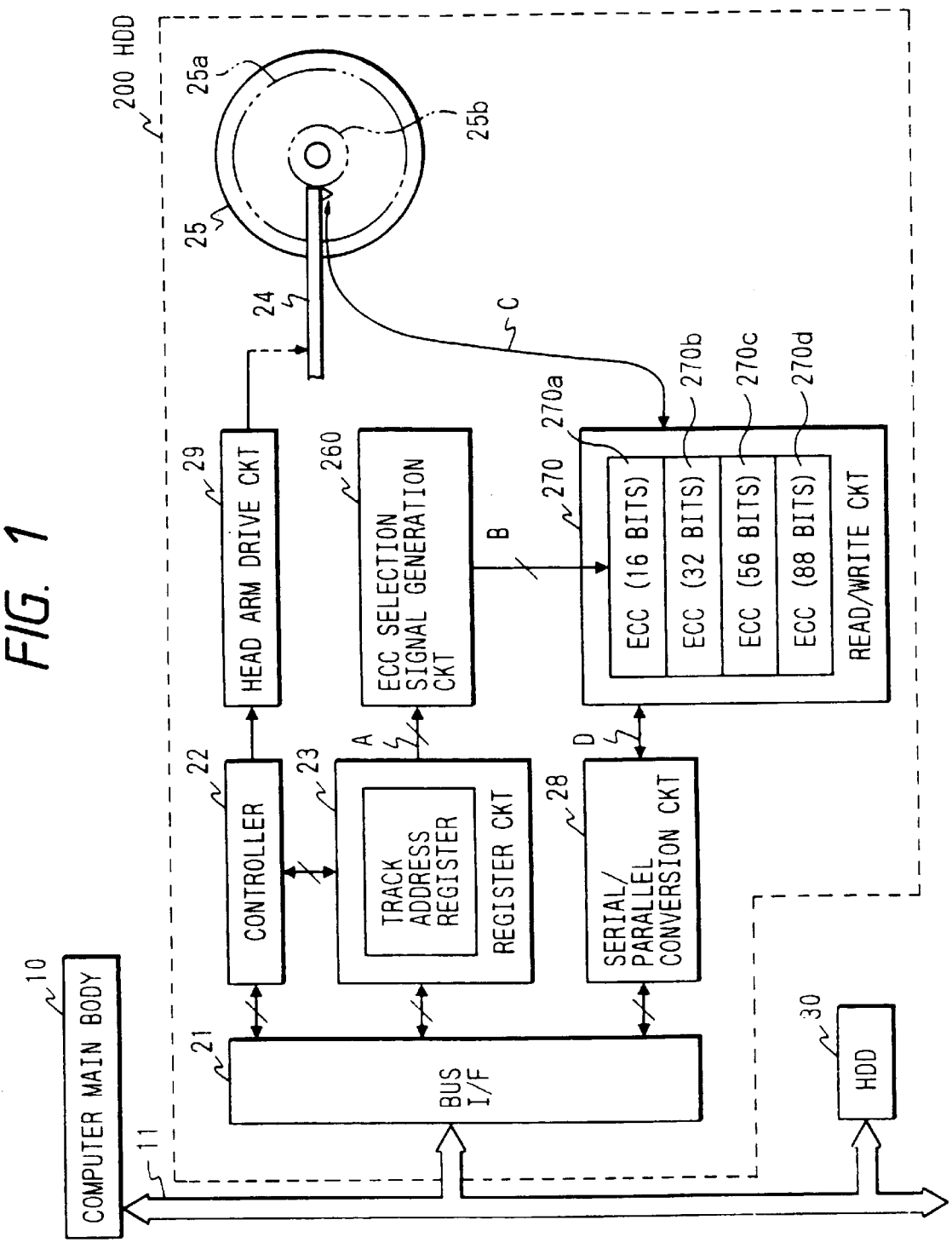
FIG. 1 is a block diagram of a hard disk drive according to an embodiment of the present invention.
Figure 2:
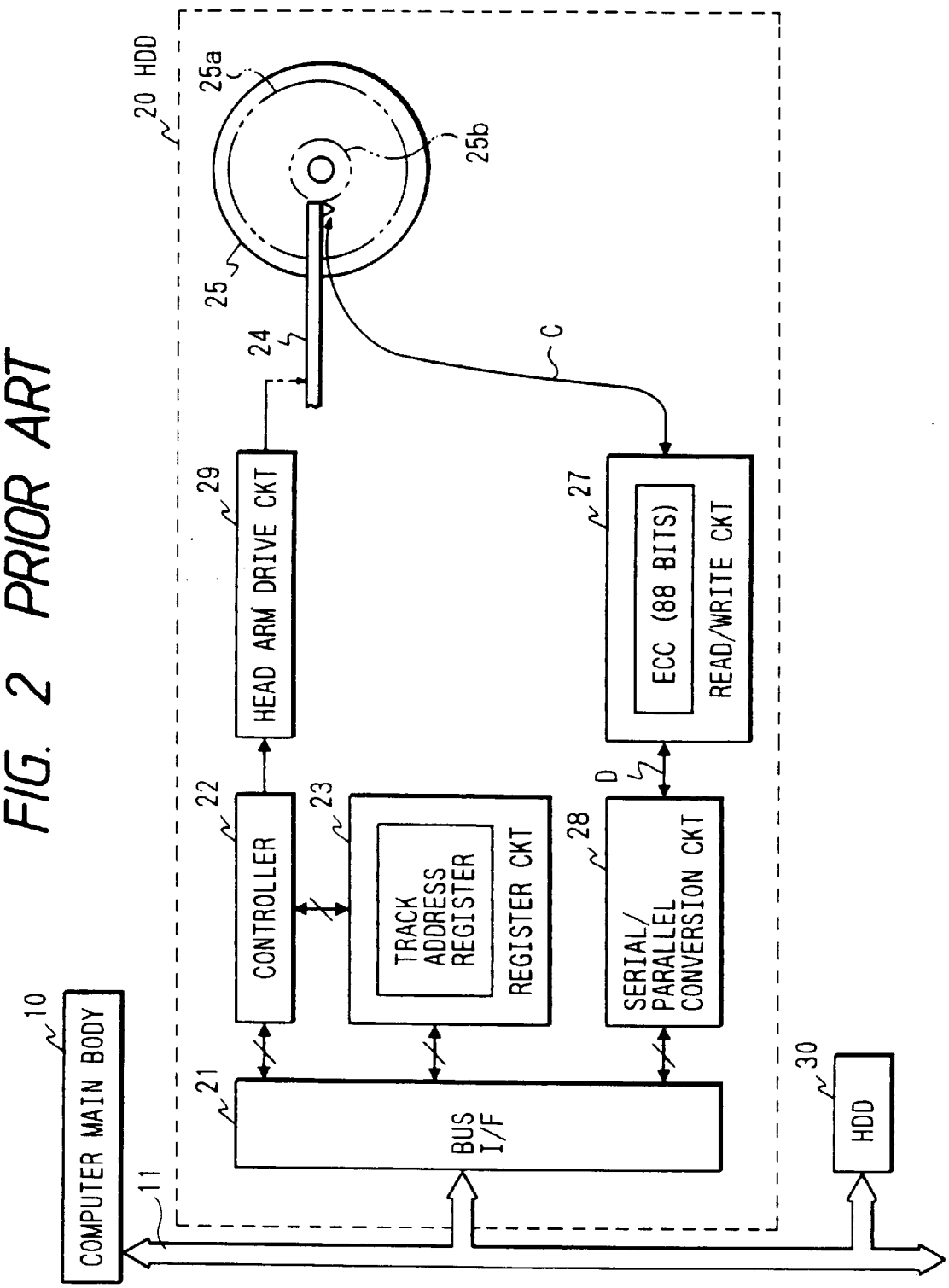
FIG. 2 is a block diagram of a conventional hard disk drive.

In FIG. 1, reference numeral 200 represents a hard disc drive (HDD) of the invention; 10, a computer main body for controlling the hard disk drive 200; 11, a bus line for devices that conform to standards of SCSI, EISA, etc.; and 30, another hard disk drive (HDD). The hard disk drive 200 includes a bus interface 21, a controller 22, a track address register 23, a head arm drive circuit 29, a read/write head arm 24, a medium 25, an ECC selection signal generation circuit 260, a read/write circuit 270, and a serial/parallel conversion circuit 28.

The track address register 23 is a register for retaining a track address A sent from the computer main body 10, and is constituted of a latch or the like as in the case of other data registers. The track address A in the track address register 23 includes a cylinder address that may be employed when a plurality of media 25 are connected as if they constituted a single medium.

In accordance with the received track address A, the ECC selection signal generation circuit 260 selectively outputs one of selection signals B. For example, four signal lines are allocated to the selection signals B, and a first selection signal is output when the value of the track signal A is within the range of 0–19, a second selection signal is output when it is within the range of 20–39, a third selection signal is output when it is within the range of 40–59, and a fourth selection signal is output when it is within the range of 60–79. A track address "0" corresponds to an outermost track 25*a*, and a track address "79" corresponds to an innermost track 25*b*.

In the read/write circuit 270, the number of bits of an ECC to be added to the data can be changed over, for instance, among four levels of 16, 32, 56 and 88 bits. These four levels correspond to the four respective signal lines for the selection signals B, and an ECC 270*a* of 16 bits is selected in response to the first selection signal, an ECC 270*b* of 32 bits is selected in response to the second selection signal, an ECC 270*c* of 56 bits is selected in response to the third selection signal, and an ECC 270*d* of 88 bits is selected in response to the fourth selection signal.

With the above relationship in correspondence, for the innermost track 25*b* the ECC of 88 bits is added to the data as in the conventional case. For the outermost track 25*a*, the ECC of 16 bits, which is smaller than the conventional case, is added. For the intermediate tracks, the ECC of the intermediate number of bits (32 or 56) is added.

As a result, except for the inner tracks, more data proper can be recorded than the conventional case by a quantity corresponding to the reduced number of ECC bits. Since the outer tracks are longer, the recording error is less likely to occur therein. Therefore, even with the above reduction of the number of ECC bits, the reliability of the outer tracks can be kept at least equivalent to that of the inner tracks, causing no problems in terms of the reliability.

Each of write and read operations of the hard disk drive 200 having the above constitution is described next. First, in the write operation, in accordance with a write instruction sent from the computer main body 10 to the hard disk drive 200 via the bus line 11, the data, to which the ECC having the proper number of bits has been added, is written to the proper track on the medium 25.

More specifically, the write instruction is provided to the controller 22 via the bus line 11 and the bus interface 21. A track address indicating a writing location on the medium 25 is provided to the track address register 23 and retained therein. Receiving the track address A, the ECC selection signal generation circuit 260 provides the proper selection signal to the read/write circuit 270, which selects the ECC having the number of bits corresponding to the selection signal. On the other hand, receiving the track address A, the head arm drive circuit 29 drives the head arm 24 under the control of the controller 22 so that a read/write head is positioned on the proper track.

Upon completion of the mechanical operation, parallel write data is sent from the computer main body 10, and converted to serial data by the serial/parallel conversion circuit 28. The ECC of the proper number of bits is calculated from the serial data, and added to the serial data. Thus, the data with the ECC having less redundancy is written to the proper track.

A head drive mechanism, medium rotational drive mechanism, etc. are neither illustrated nor explained here since they are similar to the conventional case.

In the read operation, in accordance with a read instruction sent from the computer main body 10 to the hard disk drive 200 via the bus line 11, the data recorded on the subject track on the medium 25 is read.

More specifically, the read instruction is provided to the controller 22 via the bus line 11 and the bus interface 21, and a track address indicating a reading location on the medium 25 is provided to the track address register 23 and retained therein.

Receiving the track address A, the ECC selection signal generation circuit 260 provides the proper selection signal to the read/write circuit 270, which selects the ECC having the number of bits corresponding to the selection signal. On the other hand, receiving the track address A, the head arm drive circuit 29 drives the head arm 24 under the control of the controller 22 so that a read/write head is positioned on the proper track.

Upon completion of this mechanical operation, the read/write circuit 27 reads, via the head, the ECC-added data recorded on the subject track. The ECC-added data may include a recording error originating from the medium property etc. To accommodate such a case, the original data is calculated back and reproduced from the ECC-added data using the ECC having the proper number of bits that has been added to the data at the time of the writing. Since the ECC has the restoration ability proportional to the number of bits, the ECC of 88 bits is employed for the inner tracks in which an error is likely to occur and the ECC of 16 bits is employed for the outer tracks in which an error is less likely to occur, as described above. In any case, the original data can be restored and reproduced with a high accuracy.

The serial data thus read and restored is converted by the serial/parallel conversion circuit 28 to parallel data that conforms to the standard of the bus line 11, and the parallel data is provided to the computer main body 10.

As described above, the read/write circuit 270 changes over the number of bits of the ECC, and the ECC having less redundancy is added to the data before it is written to the medium 25. The original data is calculated back and reproduced from the ECC-added data read from the medium 25. As a result, the write and read operations of the hard disk drive 200 can be performed with a less redundancy while a high accuracy is maintained, which contributes to the improvement of the storage efficiency.

According to a second embodiment of the invention, the ECC selection signal generation circuit 260 of FIG. 1 is mainly constituted of a ROM having an address space larger than that of the track address A. A parameter to be used for selecting the number of bits of the ECC which number is obtained from inspection results of the medium 25 and is most suitable for each track is written in the ROM so as to correspond to the track address.

By referring to such a collation table, or by converting the data while accessing the ROM, the ECC selection signal generation circuit 260 can produce the selection signal that is most suitable for each track. Therefore, by its scrupulous operation, the hard disk drive of the second embodiment can further reduce the redundancy from the case of the first embodiment.

The writing of the parameters to the ROM is performed independently using a ROM writer or the like, and the ROM that has been subjected to the writing is connected to the ECC selection signal generation circuit 260 via an IC socket or the like. The second embodiment is the same as the first embodiment except for the above.

It is noted that the invention can be applied to flexible disk drives in addition to hard disk drives.

As can be understood from the above description, the hard disk drive of the invention is so constructed as to enable the changing over of the number of bits of the ECC on a track or track group basis. Therefore, the invention can provide an advantage that the storage capacity of the medium can be utilized efficiently.

What is claimed is:

1. A disk drive apparatus in which an error correction code is added to data before it is written to a recording disk medium, comprising:

a selection signal generation circuit responsive to a track address indicating an access location on the medium, for generating a selection signal to be used for selecting a number of bits of the error correction code; and a read/write circuit for performing a data read or write operation to the medium while selecting the number of bits of the error correction code in accordance with the selection signal.

2. The disk drive apparatus of claim 1, the read/write circuit selects the number of bits from a plurality of numbers that are predetermined for respective groups of tracks on the medium.

3. The disk drive apparatus of claim 2, wherein the number of bits selected by the read/write circuit decreases as the group of tracks approaches an outermost track of the disk medium.

4. The disk drive apparatus of claim 1, wherein the selection signal generation circuit has a collation table that collates the track address and a detection value that is predetermined in accordance with an inspection result of the corresponding track indicating a possibility of error occurrence at the time of data writing, and generates the selection signal based on the track address and the collation table.

5. The disk drive apparatus of claim 1, wherein the disk drive apparatus is a hard disk drive.

* * * * *